J. H. STREHLI.
Stop-Valve.

No. 9,142. Reissued April 6, 1880.

Inventor.
Joseph H. Strehli,
by James H. Layman,
his Attorney.

Attest:
J. S. Robinson Jr.
C. A. Bond

N. PETERS, PHOTO-LITHOGRAPHER, WASHINGTON, D. C.

UNITED STATES PATENT OFFICE.

JOSEPH H. STREHLI, OF CINCINNATI, OHIO.

STOP-VALVE.

SPECIFICATION forming part of Reissued Letters Patent No. 9,142, dated April 6, 1880.

Original No. 114,725, dated May 9, 1871. Application for reissue filed August 8, 1879.

*To all whom it may concern:*

Be it known that I, JOSEPH H. STREHLI, of Cincinnati, Hamilton county, Ohio, have invented certain new and useful Improvements in Stop-Valves, of which the following is a specification.

My invention relates to double-seated stop-valves in which the water-way when the valve is open is direct, free, and unobstructed; and the improvement consists in the combination of a tapering-sided double-face valve fitted with rings for faces, and two sleeves fitted with rings for seats, the sleeves being so attached to the shell or case of the stop-valve that the valve may shut with uniform pressure upon the entire surface of both seats. The aforesaid sleeves are made separate from the inclosing case or shell, and are securely anchored therein by soft-metal fillings, which are poured in while in a molten condition, as hereinafter more fully described.

Figure 1:
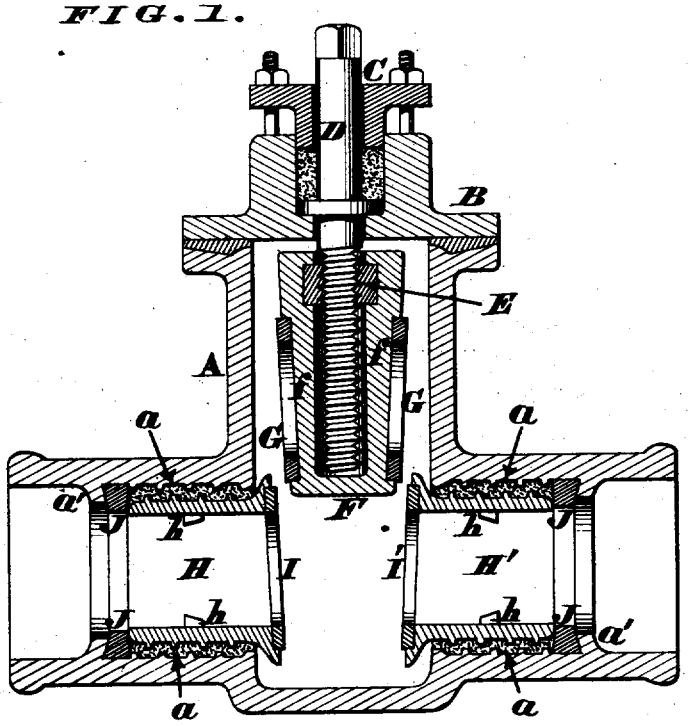
Figure 3:
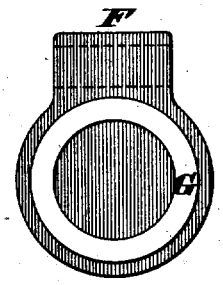
Figure 2:
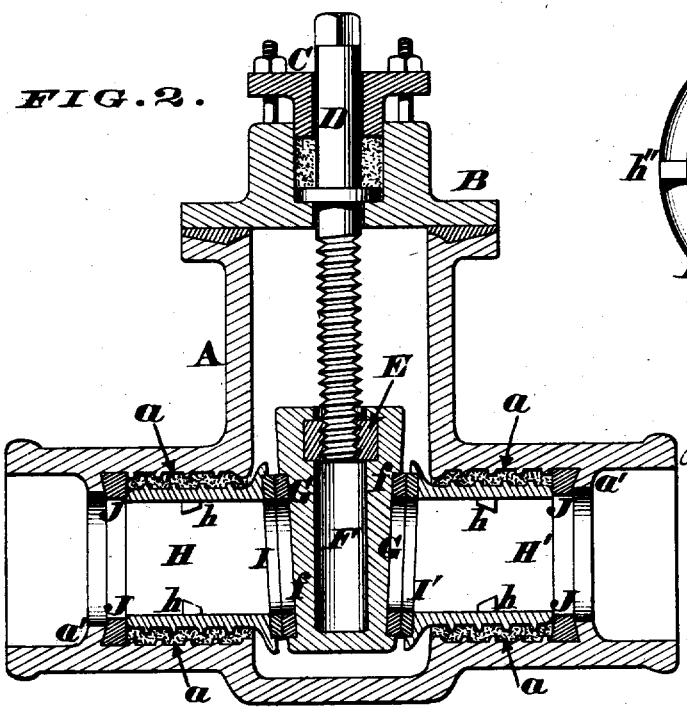
Figure 4:
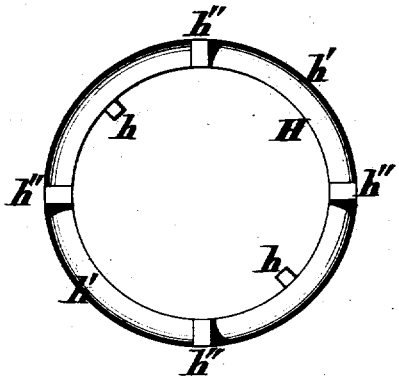

In the annexed drawings, Figure 1 is a vertical section of my improved stop-valve in the open position. Fig. 2 is a vertical section of the same in the closed position. Fig. 3 is a face view of the valve detached, and Fig. 4 is an enlarged end view of one of the sleeves detached from the shell.

A is the shell or casing of the valve, and B is the cap of the same, said cap being furnished with a customary stuffing-box, C.

D is the key or valve-stem, terminating in a screw at the end and engaging with a nut, E, that is inclosed in the valve F. This valve, being generally of large size and weight, is made of cast-iron, and in order to afford non-corrosive seats or faces for the same I form circular grooves *f* in the casting, and insert therein brass rings G.

The rings G are forced into the grooves *f* after the valve F has been heated sufficiently to expand it, and the shrinkage of the casting in cooling causes it to hug the rings G tightly, thus preventing their displacement in use.

The sleeves H H′, which are necessarily heavy for large-size stop-valves, are also formed of cast-iron, and are counterbored for the reception of brass rings I I′, which form the seats. These rings are also secured firmly by heating and shrinking the sleeves upon them. The exterior of sleeves H H′ and the interior of sockets *a*, for the reception of the same within the casing or shell A, are ribbed or roughened, as shown, and a space is left between said shell and sleeves for the reception of molten metal to secure the latter firmly in place; but before this molten metal is poured in the sleeves are drawn tightly against the faces of the valve F, when the latter is in its closed position, by the use of temporary bolts or screws inserted in the valve and pressing against clamps which rest against the slight projections *h*. The sleeves and valve are thus held firmly together with uniform pressure upon the entire valve-surface until the metal is run in and calked, the rounded edges *h′* of the sleeves facilitating the entrance and operations of the calking-tool.

To prevent the sleeves giving way in the soft metal surrounding them while in use I provide the interior collars, *a′*, and form upon the rounded ends of the sleeves right-angle ribs or webs *h″*, between which and the collars *a′* small pieces of metal, J, are driven in and swaged by hammering to the dovetail form shown, so as to prevent an escape.

By reason of the provision of the molten metal to secure the sleeves H H′ in place there is no difficulty in giving the valve an equal and full bearing upon both seats, and this is done without the necessity of accurate workmanship in the preparation of the valves and sleeves. Cheap and accurate manufacture is, therefore, secured without skilled labor.

My peculiar method of connecting the rings I I′ and rings G G to the sleeves H H′ and valve F enables the rings to be turned upon an ordinary mandrel, and faced off upon the periphery and both sides at one operation, the inside of the rings not being bored. The iron castings are also simply counterbored at one operation to receive the rings. The device also for inclasping the rings on the exterior edge permits of their being swaged to fit tightly after becoming loose by use.

The use of cement as a filling wherewith to secure the sleeves H H′ in position within the shell is expressly disclaimed as constituting part of my invention.

I claim as my invention—

1. The sleeves H H′, secured in the case by means of molten metal poured around them while they are clamped to the valve, the inner ends of said sleeves having attached to them, respectively, the ring-seats I I′, substantially as set forth.

2. In combination with the sleeves H H′, secured in the case by means of molten metal poured around them, the collars *a′* and fastening-pieces J, substantially as set forth.

3. The sleeves H H′, secured in the shell by means of molten metal poured around them, for the purpose set forth.

4. The sleeves H H′, secured in the shell by means of molten metal poured around them, the opposing ends of said sleeves being provided with non-corrosive rings I I′, for the purpose stated.

5. An improved stop-valve consisting of case A B C, operating-screw D, nutted valve E F G, sleeves H H′, and rings I I′, said sleeves being secured in position by means of molten metal poured around them, as herein explained.

In testimony of which invention I hereunto set my hand.

JOSEPH H. STREHLI.

Witnesses:

JAMES H. LAYMAN,

J. C. ROBISON, Jr.